(12) United States Patent
Lim et al.

(10) Patent No.: US 8,472,501 B2
(45) Date of Patent: Jun. 25, 2013

(54) HUMAN BODY COMMUNICATION APPARATUS FOR NON-CONTACT COMMUNICATIONS AND HUMAN BODY COMMUNICATION METHOD FOR NON-CONTACT COMMUNICATIONS IN THE SAME USING FREQUENCY SELECTIVE BASEBAND

(75) Inventors: In-Gi Lim, Daejeon (KR); Sung-Weon Kang, Daejeon (KR); Hyung-Il Park, Daejeon (KR); Chang-Hee Hyoung, Daejeon (KR); Jung-Hwan Hwang, Daejeon (KR); Sung-Eun Kim, Seoul (KR); Jin-Kyung Kim, Daejeon (KR); Tae-Wook Kang, Daejeon (KR); Hey-Jin Myoung, Seoul (KR); Jung-Bum Kim, Daejeon (KR); Kyung-Soo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 361 days.

(21) Appl. No.: 12/933,724

(22) PCT Filed: Jan. 16, 2009

(86) PCT No.: PCT/KR2009/000242
§ 371 (c)(1),
(2), (4) Date: Sep. 21, 2010

(87) PCT Pub. No.: WO2009/151196
PCT Pub. Date: Dec. 17, 2009

(65) Prior Publication Data
US 2011/0019717 A1    Jan. 27, 2011

(30) Foreign Application Priority Data

Jun. 10, 2008 (KR) .......... 10-2008-0054012
Sep. 10, 2008 (KR) .......... 10-2008-0089482

(51) Int. Cl.
*H04B 1/69* (2011.01)
*H04B 7/216* (2006.01)

(52) U.S. Cl.
USPC ........... 375/141; 375/146; 375/147; 370/441

(58) Field of Classification Search
USPC ................ 375/130, 140, 145, 146, 147, 148, 375/149, 295, 260, 285, 296, 316, 346, 377; 370/335, 342, 441
See application file for complete search history.

(56) References Cited

U.S. PATENT DOCUMENTS

| 6,160,803 | A  | * | 12/2000 | Yuen et al. | ........... 370/342 |
| 2003/0092973 | A1 | | 5/2003 | Kim et al. | |

(Continued)

FOREIGN PATENT DOCUMENTS

| EP | 0 843 425 A2 | 5/1998 |
| EP | 1 107 489 A2 | 6/2001 |

(Continued)

OTHER PUBLICATIONS

Anuj Batra et al., "An Overview of IEEE 802.15.6," BWRC Wireless Workshop 2010, Texas Instrument, pp. 1-32.*

(Continued)

*Primary Examiner* — Tesfaldet Bocure

(57) ABSTRACT

Provided are a human body communication apparatus for non-contact communications using a frequency-selective baseband and a human body communication method for non-contact communications in the same. The human body communication apparatus may be useful to perform stable communications between users by reducing interference induced from other communication apparatuses without affecting interference between the users since data are transmitted/received between communication apparatuses adjacent to a human body by spreading and despreading the data using only spreading codes of a limited frequency band (frequency-selective baseband) in which an inductive electromagnetic field formed by an antenna shows the most effective characteristics.

18 Claims, 4 Drawing Sheets

U.S. PATENT DOCUMENTS

| | | |
|---|---|---|
| 2006/0136015 A1 | 6/2006 | Park et al. |
| 2007/0140120 A1 | 6/2007 | Song et al. |
| 2010/0172394 A1* | 7/2010 | Lim et al. .................. 375/146 |

FOREIGN PATENT DOCUMENTS

| | | |
|---|---|---|
| EP | 1 298 822 A2 | 4/2003 |
| JP | 2004-48221 A | 2/2004 |
| WO | WO 2004/066833 A1 | 8/2004 |
| WO | WO 2007/049845 A2 | 5/2007 |
| WO | WO 2007/066979 A1 | 6/2007 |
| WO | WO 2008/069571 A1 | 6/2008 |

OTHER PUBLICATIONS

International Search Report for PCT/KR2009/000242 filed Jan. 16, 2009.

Written Opinion of the International Searching Authority for PCT/KR2009/000242 filed Jan. 16, 2009.

* cited by examiner

HUMAN BODY COMMUNICATION APPARATUS FOR NON-CONTACT COMMUNICATIONS AND HUMAN BODY COMMUNICATION METHOD FOR NON-CONTACT COMMUNICATIONS IN THE SAME USING FREQUENCY SELECTIVE BASEBAND

TECHNICAL FIELD

The present invention relates to a human body communication system for non-contact communications using a human body and air as transmission media, and more particularly, to a human body communication apparatus for non-contact communications using a frequency-selective baseband in the human body communication system, and a human body communication method for non-contact communications in the human body communication apparatus.

BACKGROUND ART

Human body communication is a technology using a conductive human body as a communication channel, which comprises: transmitting information to an electrode of a transmitter that is coupled to one side of the human body, receiving the transmitted information in a receiver through an electrode of the receiver that is coupled to another side of the human body or arranged outside the human body, and recovering the transmitted information.

Such human body communication technologies have been used for communications between a variety of portable devices such as a personal digital assistant (PDA), a portable personal computer, a digital camera, an MP3 player and a mobile phone, and communications with fixed devices, for example communications with a printer, a credit card payment system, a TV receiver system, an entry control system, and bus and subway fare payment systems, etc.

Human body serves as an antenna within wide frequency spectrums since the human body is composed of extraordinarily various substances and shapes and has low conductivity and high permittivity. Therefore, the human body such characteristics can be used as an antenna in communications. However, the communications may become unstable since undesired noise signals may be induced from other adjacent users or external electronic equipment, and also unstable due to the presence of surrounding objects and the distance between devices, and the position of the devices. As a result, human body communication technologies have developed to support stable communications without any adverse effects of this interference.

As one of conventional human body communication technologies, a system for directly transmitting a digital signal requires a very wide frequency band. In this case, when characteristics of a received signal are recovered, it is confirmed that strong interferences induced from peripheral equipment are also received in a receiver in addition to the signals transmitted from a transmitter. Where there are interferences generated within a transmission band, a receiver may not properly separate a desired signal although the receiver has highly excellent sensitivity. Also, a more than several tens of MHz bandwidth is required to send digital signals having several Mbps. In this case, when these digital signals are applied to a human body, the signals having a frequency over a certain frequency band are emitted from the human body. Therefore, it is difficult to construct a stable network due to the presence of the interferences between many users even when the users do not come in contact with each other.

In order for many adjacent users to stably communicate with each other without any interference between the users, there has been proposed a method of reducing an occupied frequency of signals transmitted through a human body to a frequency range at which the signals transmitted through the human body do not interfere with those from adjacent users. However, the proposed method has problems in that a transmission speed of signal may be significantly reduced due to the restricted usable frequency resource, and signals with at least several tens of MHz bandwidth are emitted without being defined in the human body when the signals are applied to a human body in consideration of the occupied frequency bandwidth, which causes interferences between adjacent users.

In order to solve the above problem, human body communication methods, such as scrambling, channel coding, interleaving and spreading methods, using a restricted pass band spanning from 5 MHz to 40 MHz bandwidth and employing information on user's innate identity (ID) have been proposed.

However, a pass band having an intermediate frequency ($f_c$) that is used in most of communication systems have been used as the limited frequency band, and therefore the communication systems requires additional analog transmitter and receiver terminal such as a digital-analog converter, an analog-digital converter, an intermediate frequency converter and the like, which indicate that these communication systems are disadvantageous in the term of low power consumption. Furthermore, the conventional human body communication technologies have problems in that they may not apply to the field of a variety of applications requiring convenience and non-contact communications since they use a signal electrode system that always comes in contact with a human body to transmit data in the form of electric filed.

DISCLOSURE OF INVENTION

Technical Problem

The present invention is designed to solve the problems of the prior art, and therefore it is an object of the present invention to provide a human body communication apparatus for stable contact and non-contact communications and a human body communication method for non-contact communications in the human body communication apparatus using a human body and air as media without allowing signals from users to interfere with each other at the presence of many users and undergoing influences of strong interferences induced from other electronic equipment.

In addition, it is still another object of the present invention to provide a human body communication apparatus for non-contact communications and a human body communication method for non-contact communications in the human body communication apparatus, which operates at low energy consumption and is strongly resistant to external noises, by using a limited frequency band (frequency-selective baseband) at which the apparatus shows the most effective characteristics in data transmissions through human bodies and inductive electromagnetic fields by antennas.

Technical Solution

According to an aspect of the present invention, there is provided a human body communication apparatus for non-contact communications using a frequency-selective baseband, including a human body communication transmitter receiving data to be transmitted to generate transmitted data, spreading the generated transmitted data into frequency-selective spreading codes using a frequency-selective baseband, multiplexing the frequency-selectively spread transmitted data with preambles for frame synchronization and a header including information on data, and outputting the multiplexed transmitted data as a transmitted signal; a signal processing unit amplifying the transmitted signal received from the human body communication transmitter; and an antenna making contact or non-contact with a human body to transmit the amplified transmitted signal through the human body to a communication apparatus adjacent to the human body.

According to another aspect of the present invention, there is provided a human body communication apparatus for non-contact communications using a frequency-selective baseband, including an antenna making contact or non-contact with a human body to receive a received signal through the human body from a communication apparatus adjacent to the human body; a signal processing unit removing noises from the received signal and amplifying the noises-free received signal; and a human body communication receiver demultiplexing the received signal received from the signal processing unit to despread a header separated from the received signal and despreading the received data separated from the received signal into frequency-selective spreading codes by using a frequency-selective baseband.

According to still another aspect of the present invention, there is provided a human body communication method for non-contact communications in the human body communication apparatus, the method including: making contact or non-contact with the human body to spread transmitted data, which is transmitted through the human body to a communication apparatus adjacent to the human body, into frequency selective spreading codes using a frequency-selective baseband; spreading preambles and header of the transmitted data into the pre-set spreading codes; outputting a transmitted signal obtained by multiplexing the frequency-selectively spread data, the spread preambles and the spread header according to a predetermined frame architecture; and amplifying the transmitted signal to transmit the amplified transmitted signal to the human body through an antenna that comes in contact or non-contact with the human body.

According to yet another aspect of the present invention, there is provided a human body communication method for non-contact communications in the human body communication apparatus, the method including: processing a received signal received from a communication apparatus adjacent to a human body through an antenna that comes in contact or non-contact with the human body; demultiplexing the received signal to separate a header region and a received data region from the received signal; processing the header separated from the received signal by despreading the header into pre-set spreading codes; despreading the received data separated from the received signal using frequency-selective spreading codes; and processing the despread received data to transmit the despread received data to higher layers.

Advantageous Effects

As described above, the human body communication apparatus for non-contact communications according to one exemplary embodiment of the present invention may be useful to perform stable human body communications in a contact or non-contact communication manner without interferences between the users and influences of strong interferences induced from other electronic equipment by using a limited frequency band (frequency-selective baseband) at which an inductive electromagnetic field formed by an antenna shows the most effective characteristics and human bodytransmissions of data is most excellent in the human body communication system, and also useful to apply the human body communication system for non-contact communications to the field of various more convenient applications.

Also, the human body communication apparatus for non-contact communications according to one exemplary embodiment of the present invention may be useful to transmit more data at the same frequency band by reducing a frequency band required for data transmissions through the serial-to-parallel conversion of data, and transmit high-quality data at the same frequency band using a larger spreading code gains.

BEST MODE FOR CARRYING OUT THE INVENTION

Hereinafter, exemplary embodiments of the present invention will now be described in detail with reference to the accompanying drawings. However, detailed descriptions related to well-known functions or configurations will be omitted in order not to unnecessarily obscure subject matters of the present invention.

An inductive electromagnetic field induced in a non-contact communication manner in a human body by an antenna shows excellent characteristics such as permeability and uniformity, compared to the electric field transmitted by a signal electrode that comes in contact with the skin of a human body. In general, the contact communication manner is more advantageous in terms of the size of signal than the non-contact communication manner. In accordance with one exemplary embodiment of the present invention, the human body communication system may apply to both the non-contact communication manner of transmitting a signal through an inductive electromagnetic field by an antenna and the contact communication manner of transmitting a signal by making contact with a human body, wherein the contact communication manner is more excellent in terms of the size of transmitted signal than the non-contact communication manner. Also, the human body communication system does not use a conventional pass band but a frequency-selective baseband to employ a frequency band at which a human body communication system shows excellent proximity inductive coupling and human body transmission characteristics, rather than a frequency band of 0~5 MHz at which the highest noise power is generated due to the focusing of interference from external devices.

A frequency-selective baseband transmission technology is a technology in which a user uses only spreading codes having the most predominant frequency characteristics at a desired frequency band out of all spreading codes (or, spreading sequences) used for processing gain of data. This frequency-selective baseband transmission technology has effects to transmit data at a baseband at which an analog transmitter/receiver block with a simple structure may be used, and simultaneously obtain a desired frequency band and a processing gain.

Then, the human body communication apparatus and method using a frequency-selective baseband in the human body communication system for non-contact communications according to one exemplary embodiment of the present invention are described in more detail with reference to the accompanying drawings.

Figure 1:
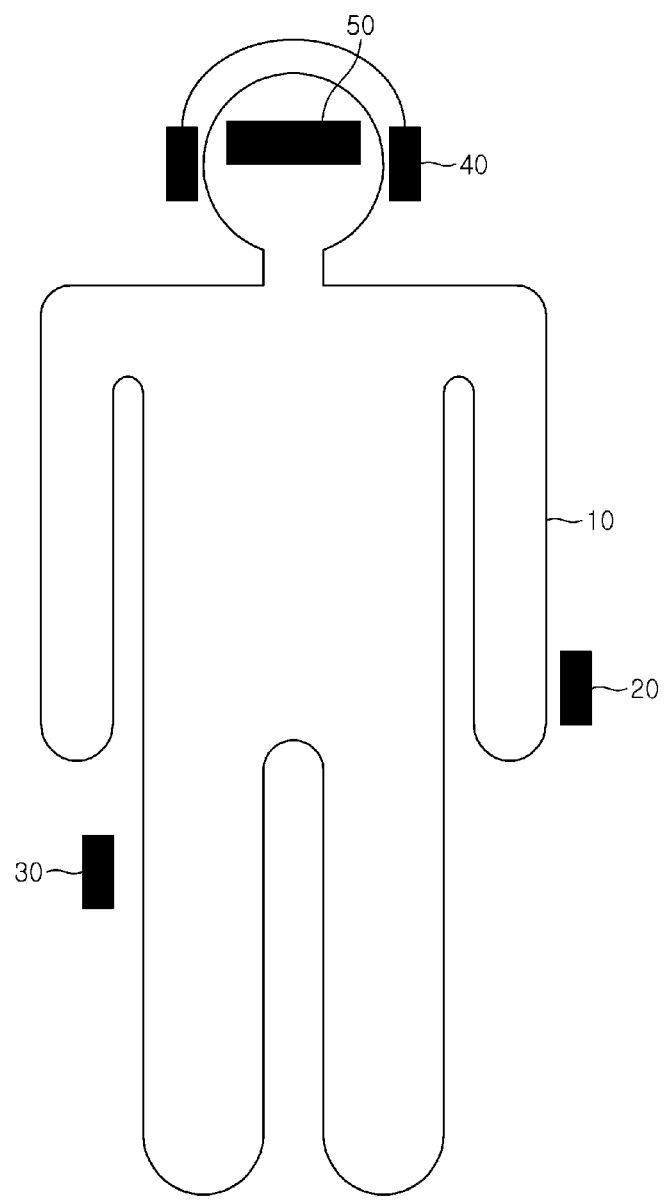
FIG. 1 is a diagram illustrating a human body communication system for non-contact communications according to one exemplary embodiment of the present invention.
Figure 2:
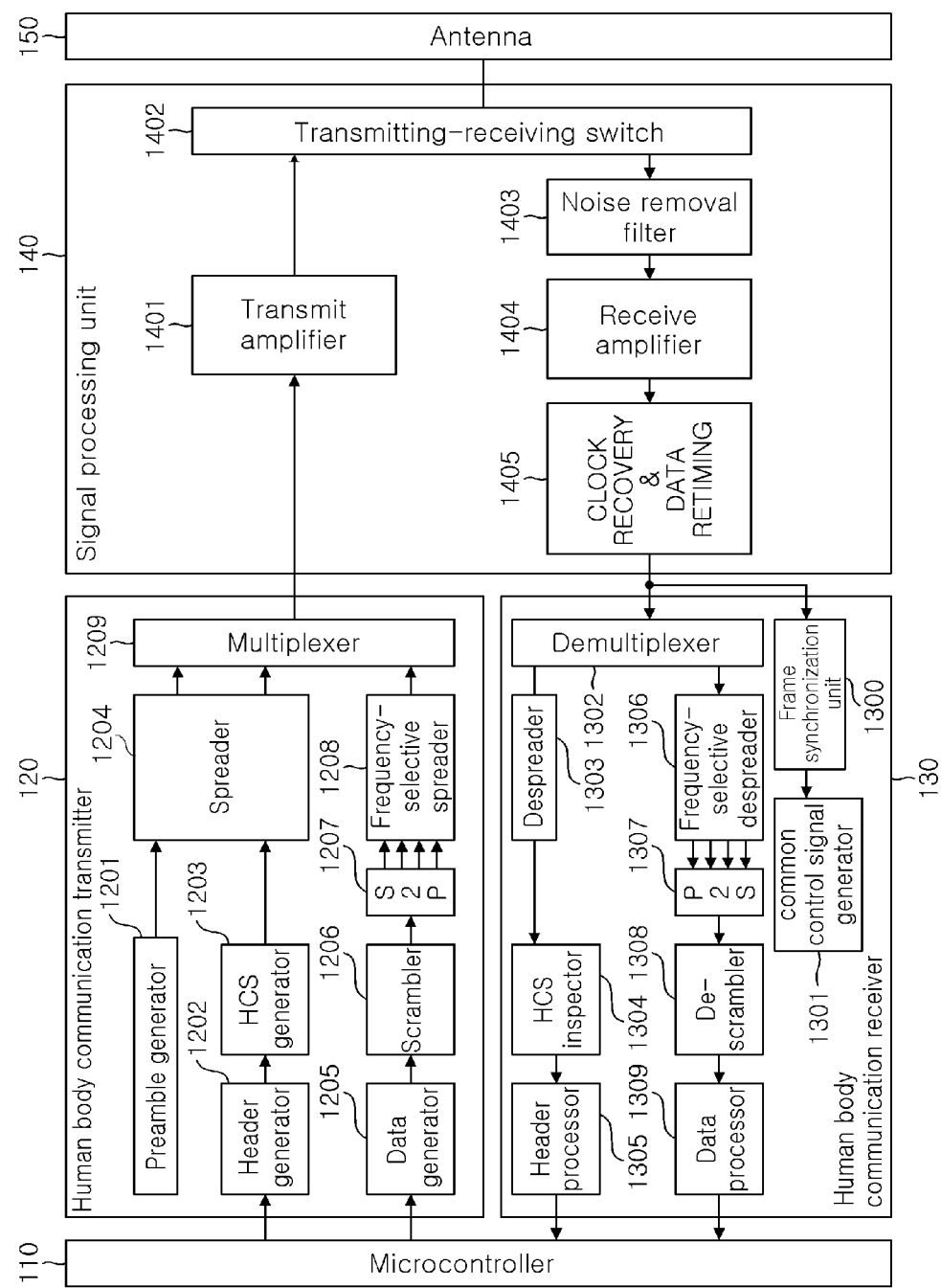
FIG. 2 is a diagram illustrating a configuration of the human body communication apparatus for non-contact communications using a frequency-selective baseband according to one exemplary embodiment of the present invention.

FIG. 1 is a diagram illustrating a human body communication system for non-contact communications according to one exemplary embodiment of the present invention, and FIG. 2 is a diagram illustrating a configuration of the human body communication apparatus for non-contact communications using a frequency-selective baseband according to one exemplary embodiment of the present invention.

As shown in FIG. 1, the human body communication system for non-contact communications may include human body communication apparatuses to enable non-contact communications when they are disposed adjacent to a human body 10. Here, the human body communication apparatuses include various devices such as human body communication mobile terminals 20 and 30, a headset 40 and a glass-type monitor (or, a head mount display (HMD)) 50, and function to perform communications between corresponding devices through a human body 10 in a contact or non-contact communication manner using a frequency-selective baseband. For example, music transmitted from a mobile terminal 20, which is installed about the wrist in a contact or non-contact manner, is spread into frequency-selective spreading codes, and transmitted to the human body 10 using a magnetic field formed by an antenna installed inside the mobile terminal 20. Then, the data induced and transmitted through the human body 10 induce a magnetic field formed in the antenna of the headset 40. The transmitted data are despread into frequency-selective spreading codes to allow a user to hear the sound of music through a loud speaker installed inside the headset 40. As another example, moving image data played on a human body communication mobile terminal 30 such as a portable multimedia player (PMP) in the pocket are spread into frequency-selective spreading codes, and the spread moving image data are transmitted to the human body 10 through an antenna of the human body communication mobile terminal 30 by using a magnetic field. Then, the data induced and transmitted through the human body 10 induce the magnetic field to an antenna of the glass-type monitor 50. The transmitted data are despread into frequency-selective spreading codes to display a moving image on a screen of the glass-type monitor 50.

The structures of the devices 20, 30, 40 and 50 of the human body communication system for non-contact communications used to perform the above-mentioned human body communications, that is, the human body communication apparatuses for non-contact communications using a frequency-selective baseband, will be described in more detail with reference to FIG. 2, as follows.

The human body communication apparatus for non-contact communications may include a microcontroller 110, a human body communication transmitter 120, a human body communication receiver 130, a signal processing unit (or, an analog front end (AFE)) 140 and an antenna 150.

The microcontroller 110 processes data to be transmitted and data information, which are received from higher layers, and transmits the processed data and data information to the human body communication transmitter 120. Also, the microcontroller 110 processes received data received from the human body communication receiver 130, and data information extracted from headers, and then transmits the processed received data and data information to the higher layers.

The human body communication transmitter 120 may be dividedly composed of a preamble/header transmission processing unit, a data transmission processing unit and a multiplexer 1209. The preamble/header transmission processing unit includes a preamble generator 1201, a header generator 1202, a header check sequence (HCS) generator 1203 and a spreader 1204. The data transmission processing unit includes a data generator 1205, a scrambler 1206, a serial-to-parallel converter (S2P) 1207 and a frequency-selective spreader 1208.

The preamble generator 1201 is pre-set to a reset value that all users know, and functions to generate preambles each having a constant length for frame synchronization and transmit the generated preambles to the spreader 1204.

The header generator 1202 receives data information transmitted from the microcontroller 110, that is, transmission speed, modulation method, user ID, data length and the like, to construct headers using a pre-set header format.

The header check sequence generator 1203 receives the headers constructed in the header generator 1202 to generate a header check sequence.

The spreader 1204 spreads the headers, each of which include the generated preambles and the generated header check sequence, into pre-set spreading codes.

The data generator 1205 receives data to be transmitted from the microcontroller 110, to generate transmitted data, and outputs the generated transmitted data into the scrambler 1206 at a desired time point.

The scrambler 1206 is reset by the reset value that is pre-set and exchanged between terminals, and functions to scramble the transmitted data by implementing an exclusive OR (XOR) operation with the generated orthogonal codes on the transmitted data outputted from the data generator 1205.

The serial-to-parallel converter 1207 receives the scrambled data to perform a 4-bit serial-to-parallel conversion, and transmits the converted parallel data to the frequency-selective spreader 1208. Then, the converted parallel data are used to select the spreading codes. Here, a frequency band used is reduced by ¼ as a result of the serial-to-parallel conversion, which indicates that more data may be transmitted at the same frequency band, or high-quality data may be transmitted at the same frequency band by using a larger spreading code gains.

The frequency-selective spreader 1208 receives 4-bit output bits of the serial-to-parallel converter 1207 in parallel, spreads the received output 4 bits into frequency-selective spreading codes, and then outputs the spread data into the multiplexer 1209. And, the frequency-selective spreader 1208 uses $2^N$ Walsh codes as the spreading codes. Here, when the frequency-selective spreader 1208 selects and uses $2^M$ (M<N) Walsh codes, the frequency-selective spreader 1208 arranges (N−M) input bits out of the total of input bits (N) on the highest bits, and selects only a desired frequency band out of the total of the spread frequency band by adjusting an (N−M)-bit input value using a parameter input value. The baseband transmission using a desired frequency band may be achieved by the frequency-selective spreader 1208, and the digital direct transmission may be achieved by output bit, that is one bit. A configuration of the frequency-selective spreader 1208 is described later in brief, but the detailed description of its operation is omitted for clarity. Here, it should be considered that another frequency-selective spreader 1208 having an improved structure may be used in one exemplary embodiment of the present invention.

The frequency-selective spreader 1208 includes an N-bit counter (a 6-bit counter: $C_0$ to $C_5$), and (N−1) first exclusive OR (XOR) logic circuits and N AND logic circuits, all of which are used for gray indexing, and also include a second XOR logic circuit to receive the output bits of the AND logic circuits as input bits and output 1-bit data. Here, the first XOR logic circuits receive (N−M)-bit frequency-selective control bits (2-bit frequency-selective control bits: fs1, fs0) and M-bit data input bits ($b_0$ to $b_3$), and perform an XOR operation on the received input bits. The AND logic circuits receive output bits of the N-bit counter, the highest bits of the frequency-selective control bits and output bits of the first XOR logic circuits as input bits, and perform an AND operation on the received input bits.

The multiplexer 1209 outputs a transmitted signal including preambles, headers and data to the signal processing unit 140. A transmit amplifier 1401 of the signal processing unit 140 amplifies a transmitted signal when necessary, and transmits the amplified transmitted signal to a human body through an antenna 150 that is in contact with the human body or not via a transmitting-receiving switch 1402, and finally to a communication apparatus adjacent to the human body.

Meanwhile, the human body communication receiver 130 may be dividedly composed of a frame synchronization unit 1300, a common control signal generator 1301, a demultiplexer 1302, a header receiving processor and a data receiving processor. Here, the header receiving processor includes a despreader 1303, a header check sequence inspector 1304 and a header processor 1305, and the data receiving processor includes a frequency-selective despreader 1306, a parallel-serial converter (P2S) 1307, a descrambler 1308 and a data processor 1309.

The frame synchronization unit 1300 receives a received signal from the signal processing unit 140, and uses the preambles to perform frame synchronization on the received signal.

The common control signal generator 1301 generates common control signals, such as a frame boundary signal, a header period signal, a data period signal, a transmit period signal, a receive period signal and the like, that are required in the human body communication receiver 120.

When the frame synchronization is achieved by the frame synchronization unit 130, the demultiplexer 1302 uses the generated common control signals to separate a header region and a data region from the received signal, and then output the header region into the despreader 1303 and outputs the data region into the frequency-selective despreader 1306.

The despreader 1303 spreads the separated header region, and the header check sequence inspector 1304 inspects a header check sequence included in the header region.

When it is proven that there is no error in the inspection of the header check sequence by the header check sequence inspector 1304, the header processor 1305 extracts control information on the received data from the received header, and then transmits the extracted control information to the microcontroller 110.

The frequency-selective despreader 1306 receives the data region to calculate a correlation value in a correlator, which uses 16 of the 64 spreading codes that are used in the transmitter 120 in a frequency-selective manner, and then outputs 4-bit data as the highest bit value.

The parallel-to-serial converter 1307 converts the 4-bit data outputted from the frequency-selective despreader 1306 into serial data.

The descrambler 1308 descrambles the inputted received data using the orthogonal codes generated with the use of the reset value that is pre-set and exchanged between terminals.

The data processor 1309 processes the data descrambled in the descrambler 1308, and then transmit the processed data to the microcontroller 110.

Meanwhile, the signal processing unit 140 includes a transmit amplifier 1401 amplifying a transmitted signal, a transmitting-receiving switch 1402, a noise removal filter 1403 removing noises from the received signal, a receive amplifier 1404 amplifying the received signal and a clock recovery & data retiming unit (CDR) 1405. Here, the clock recovery & data retiming unit (CDR) 1405 performs the timing synchronization of the amplified received signal with a receiving-end clock and the frequency offset correction of the amplified received signal, and the transmit amplifier 1401 amplifies the transmitted signal outputted from the multiplexer 1209, and transmits the amplified transmitted signal to the transmitting-receiving switch 1402. Then, the amplified transmitted signal transmitted to the transmitting-receiving switch 1402 is outputted into the antenna 150.

The antenna 150 may be realized using a coil antenna method using an enamel wire and the like is weaved, an ink-jet method using metallic ink, a screen printing method, etc.

Then, the human body communication method for non-contact communications in the human body communication apparatus is described in more detail. Here, the human body communication method is used for the frequency spreading by using a limited frequency band, that is, a frequency-selective baseband at which the human body communication system shows excellent proximity inductive coupling and human body transmission characteristics. In the description of the human body communication method for non-contact communications, data transmission and reception procedures are dividedly described. First, the data transmission procedure is described in more detail with reference to FIG. 3.

Figure 3:
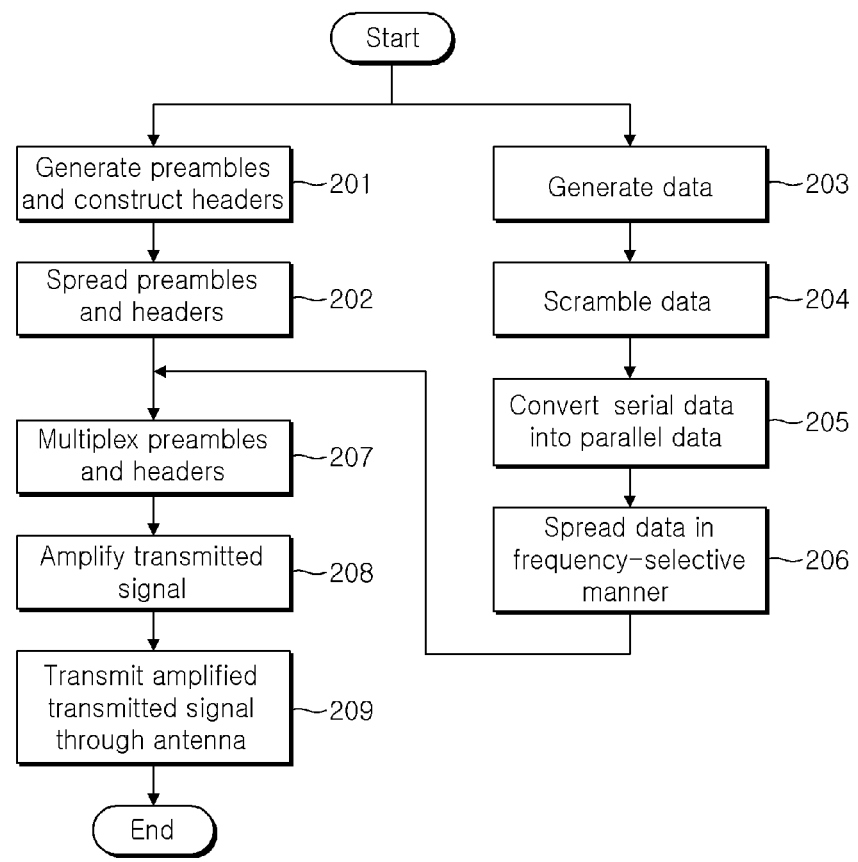
FIG. 3 is a diagram illustrating a data transmission procedure using a frequency-selective baseband in the human body communication apparatus for non-contact communications according to one exemplary embodiment of the present invention.

FIG. 3 is a diagram illustrating a data transmission procedure using a frequency-selective baseband in the human body communication apparatus for non-contact communications according to one exemplary embodiment of the present invention.

Referring to FIG. 3, the human body communication apparatus for non-contact communications generates preambles having a constant length that is pre-set to a reset value that all users know, and constructs headers using data information as a pre-set header format (operation 201). Then, the human body communication apparatus for non-contact communications spreads the generated preambles and the constructed headers into pre-set spreading codes (operation 202).

At the same time, the human body communication apparatus for non-contact communications generates data to be transmitted and outputs the generated data into the scrambler 1206 at a desired time point (operation 203), and scrambles the generated data by implementing an exclusive OR (XOR) operation on the generated data with orthogonal codes generated in the scrambler 1206 (operation 204). Subsequently, the human body communication apparatus for non-contact communications converts the scrambled serial data into parallel data (operation 205).

Next, the human body communication apparatus for non-contact communications spreads the converted 4-bit parallel data into the frequency-selective spreading codes (operation 206). More particularly, the human body communication apparatus for non-contact communications, for example, uses 64 Walsh codes. Here, where it is assumed that the human body communication apparatus selects and uses 16 of the 64 Walsh codes, the frequency-selective spreader 1208 implements an XOR operation on 2-bit frequency-selective control bits (fs1, fs0) with 4-bit input data bits ($b_0$ to $b_3$), and implements an AND operation on the output bits with the 6-bit counter ($C_0$ to $C_3$). Then, the frequency-selective spreader 1208 implements an XOR operation on the AND operation output bits, and finally outputs 1-bit output data (FS_DOUT). Here, the frequency-selective control bits (fs1, fs0) are fixedly set to a value of "11".

Then, the preambles, headers and data spread in operations 202 and 206 are multiplexed to meet the frame construction (operation 207), the transmitted data multiplexed and outputted from the transmitter are amplified (operation 208), and the amplified transmitted signal is transmitted through the antenna 150 (operation 209).

Next, the data reception procedure is described in more detail with reference to FIG. 4.

Figure 4:
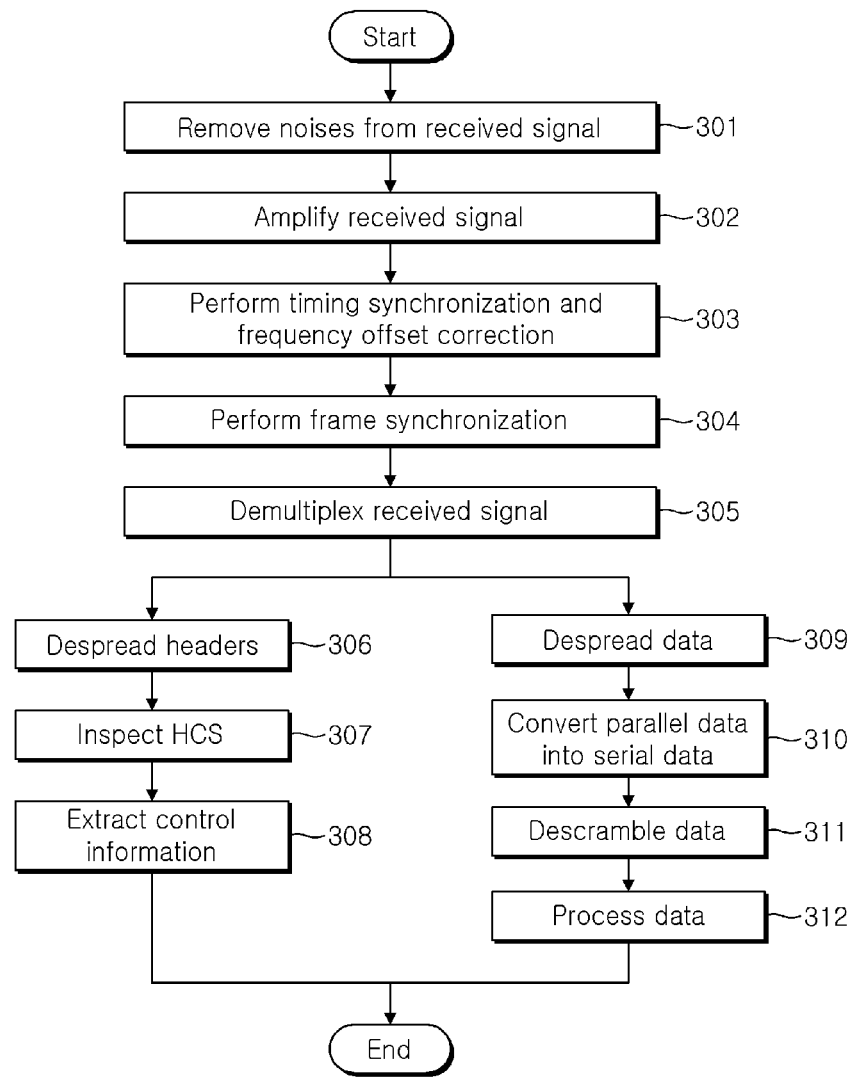
FIG. 4 is a diagram illustrating a data reception procedure using a frequency-selective baseband in the human body communication apparatus for non-contact communications according to one exemplary embodiment of the present invention.

FIG. 4 is a diagram illustrating a data reception procedure using a frequency-selective baseband in the human body communication apparatus for non-contact communications according to one exemplary embodiment of the present invention.

Referring to FIG. 4, the human body communication apparatus for non-contact communications removes noises from the received signal received through the antenna 150, the noises being added when the received signal is transmitted through the human body (operation 301), and amplifies the noise-free received signal to a desired signal size (operation 302). Then, the human body communication apparatus for non-contact communications performs the timing synchronization of the amplified received signal with a receiving-end clock and the frequency offset correction of the amplified received signal (operation 303).

Subsequently, the human body communication apparatus for non-contact communications performs the frame synchronization so as to achieve frame synchronization of the received signal (operation 304), and demultiplexes the received signal to separate a header region and a data region from the received signal, and extracts the header region and the data region (operation 305) when the frame synchronization is achieved by the frame synchronization unit 130.

Then, the human body communication apparatus for non-contact communications transmits the header region to the despreader 1303 to despread the header into pre-set spreading codes in the despreader 1303 (operation 306), inspects a header check sequence included in the header (operation 307), and then extracts control information of the received signal data from the header using the header check sequence (operation 308).

At the same time, the human body communication apparatus for non-contact communications transmits the received data of the data region separated in operation 305 to the frequency-selective despreader 1306 in order to despread the received data in the frequency-selective despreader 1306 using frequency-selective spreading codes (operation 309). That is, the human body communication apparatus for non-contact communications calculates a correlation value in the correlator, which uses 16 of the 64 spreading codes that are used in the transmitter 120 in a frequency-selective manner, and then outputs 4-bit data as the highest bit value. Then, the human body communication apparatus for non-contact communications converts the 4-bit despread output data into serial data (operation 310), and descrambles the converted serial data using orthogonal codes outputted from an orthogonal code generator which is reset to a predetermined reset value (operation 311). Subsequently, the human body communication apparatus for non-contact communications processes the descrambled data and transmits the processed descrambled data to the microcontroller 110 (operation 312).

As described above, the human body communication apparatus for non-contact communications according to one exemplary embodiment of the present invention may be useful to reduce power consumption of the entire system, by directly transmitting a selected frequency band (frequency-selective baseband) in a digital transmission method using the frequency-selective spreading codes, since the human body communication apparatus does not require the analog transmitting terminals such as a transmit filter, a digital-analog converter and an intermediate frequency converter, and the analog receiving terminals such as an analog-digital converter.

Also, the human body communication apparatus for non-contact communications according to one exemplary embodiment of the present invention may be useful to obtain the processing gain of the entire system since a higher level of the spreading codes may be used by the frequency gain obtained from the serial-to-parallel conversion of the transmitted data, and also to transmit larger data, which is increased in size as much as a serial-to-parallel conversion ratio than date transmitted by the spreading method by multiplying preexisting data by the spreading codes, by employing a modulation method that uses the output data of the serial-to-parallel converter to select the spreading codes.

While the present invention has been shown and described in connection with the exemplary embodiments, it will be apparent to those skilled in the art that modifications and variations can be made without departing from the scope of the invention as defined by the appended claims. Therefore, it should be understood that the scope of the present invention is not designed to limit the exemplary embodiments of the present invention, but is construed as being the appended claims and equivalents thereof.

The invention claimed is:

1. A human body communication apparatus for non-contact communications using a frequency-selective baseband, comprising:
    a human body communication transmitter receiving data to be transmitted to generate transmitted data, spreading the generated transmitted data into frequency-selective spreading codes using a frequency-selective baseband, multiplexing the frequency-selectively spread transmitted data with preambles for frame synchronization and a header including information on data, and outputting the multiplexed transmitted data as a transmitted signal;
    a signal processing unit amplifying the transmitted signal received from the human body communication transmitter; and
    an antenna making contact or non-contact with a human body to transmit the amplified transmitted signal through the human body to a communication apparatus adjacent to the human body.

2. The human body communication apparatus of claim 1, wherein the preambles for frame synchronization and the header including information on data are spread before multiplexing, the human body communication apparatus further comprising:
    a human body communication receiver demultiplexing a received signal received through the antenna from the human body, which is not in contact with the antenna, to despread a header separated from the received signal and despreading received data separated from the received signal into the frequency-selective spreading codes.

3. The human body communication apparatus of claim 1, wherein the human body communication transmitter comprises:
 a preamble/header transmission processing unit spreading the preambles for frame synchronization and the headers on the transmitted data;
 a data transmission processing unit converting the transmitted data into parallel data, and spreading the converted transmitted data using the frequency-selective spreading codes; and
 a multiplexer multiplexing the preambles and the header spread by the preamble/header transmission processing unit with the transmitted data spread by the data transmission processing unit and outputting the multiplexed data signal as a transmitted signal.

4. The human body communication apparatus of claim 3, wherein the preamble/header transmission processing unit comprises:
 a preamble generator generating preambles; a header generator generating the header using information on the data received through a microcontroller from higher layers;
 a header check sequence generator generating a header check sequence of the generated header; and
 a spreader spreading the generated preambles and header using the pre-set spreading code.

5. The human body communication apparatus of claim 3, wherein the data transmission processing unit comprises:
 a data generator receiving data to be transmitted through a microcontroller from higher layers to generate transmitted data and outputting the generated transmitted data at a desired time point;
 a scrambler scrambling transmitted data outputted from the data generator using orthogonal codes generated with the use of a predetermined and exchanged reset value;
 a serial-to-parallel converter converting the transmitted data outputted serially from the scrambler into parallel data; and
 a frequency-selective spreader spreading the converted transmitted data into the frequency-selective spreading code using the frequency-selective baseband.

6. A human body communication apparatus for non-contact communications using a frequency-selective baseband, comprising:
 an antenna making contact or non-contact with a human body to receive a received signal through the human body from a communication apparatus adjacent to the human body;
 a signal processing unit removing noises from the received signal and amplifying the noises-free received signal; and
 a human body communication receiver demultiplexing the received signal received from the signal processing unit to despread a header separated from the received signal and despreading the received data separated from the received signal into frequency-selective spreading codes by using a frequency-selective baseband.

7. The human body communication apparatus of claim 6, further comprising a human body communication transmitter spreading transmitted data using the frequency-selective spreading codes, the transmitted data being transmitted through the human body to the communication apparatus adjacent to the human body, multiplexing the spread transmitted data with preambles for frame synchronization and a header including information on data, and outputting the multiplexed transmitted data as a transmitted signal.

8. The human body communication apparatus of claim 6, wherein the human body communication receiver comprises:
 a demultiplexer demultiplexing the received signal to separate the preambles and a header region and a data region from the received signal;
 a header receiving processor despreading the header separated from the received signal; and
 a data receiving processor despreading the received data separated from the received signal by using the frequency-selective spreading codes.

9. The human body communication apparatus of claim 8, wherein the human body communication receiver further comprises:
 a frame synchronization unit performing a frame synchronization using preambles of the received signal outputted from the signal processing unit; and
 a common control signal generator generating a common control signal to control the human body communication receiver when the frame synchronization is achieved by the frame synchronization unit.

10. The human body communication apparatus of claim 8, wherein the header receiving processor comprises:
 a despreader despreading the header;
 a header check sequence inspector performing an error inspection on the despread header using a header check sequence included in the despread header; and
 a header processor extracting data information on the received data from the despread header.

11. The human body communication apparatus of claim 8, wherein the data receiving processor comprises:
 a frequency-selective despreader despreading the separated received data using the frequency-selective spreading codes;
 a parellel-to-serial converter converting the received data outputted from the frequency-selective despreader into serial data;
 a descrambler descrambling the converted received data using orthogonal codes generated with the use of a predetermined and exchanged reset value; and
 a data processor transmitting the descrambled received data to higher layers through a microcontroller.

12. A human body communication method for non-contact communications in the human body communication apparatus, comprising:
 making contact or non-contact with the human body to spread transmitted data, which is transmitted through the human body to a communication apparatus adjacent to the human body, into frequency-selective spreading codes using a frequency-selective baseband;
 spreading preambles and header of the transmitted data into the pre-set spreading codes; outputting a transmitted signal obtained by multiplexing the frequency-selectively spread data, the spread preambles and the spread header according to a predetermined frame architecture; and
 amplifying the transmitted signal to transmit the amplified transmitted signal to the human body through an antenna that comes in contact or non-contact with the human body.

13. The human body communication method of claim 12, wherein the spreading of the transmitted data into the frequency-selective spreading codes using a frequency-selective baseband comprises:
 generating transmitted data to be transmitted; scrambling the generated transmitted data;

converting the scrambled transmitted data into parallel data; and spreading the converted transmitted data into the frequency-selective spreading codes using the frequency-selective baseband.

14. The human body communication method of claim 12, further comprising:

spreading preambles and header of the transmitted data into pre-set spreading codes;

generating preambles for frame synchronization on the transmitted data;

generating header of the transmitted data using information on the data received from higher layers;

generating a header check sequence for the received information on the data; and spreading the generated preambles and header into the pre-set spreading codes.

15. A human body communication method for non-contact communications in the human body communication apparatus, comprising:

processing a received signal received from a communication apparatus adjacent to a human body through an antenna that comes in contact or non-contact with the human body;

demultiplexing the received signal to separate a header region and a received data region from the received signal;

processing the header separated from the received signal by despreading the header into pre-set spreading codes;

despreading the received data separated from the received signal using frequency-selective spreading codes; and processing the despread received data to transmit the despread received data to higher layers.

16. The human body communication method of claim 15, further comprising:

performing a frame synchronization using the preambles of the received signal; and generating a common control signal when the frame synchronization is achieved.

17. The human body communication method of claim 15, wherein the processing of the header by despreading the header into the pre-set spreading codes comprises:

performing an error inspection on the despread headers using a header check sequence; and extracting data information included in the despread headers.

18. The human body communication method of claim 15, wherein the processing of the despread received data to transmit the despread received data to higher layers comprises:

converting the despread received data into serial data;

descrambling the converted received data using orthogonal codes generated with the use of a predetermined reset value; and transmitting the descrambled received data to higher layers through a microcontroller.

* * * * *